United States Patent [19]

Stage

[11] Patent Number: 4,810,330

[45] Date of Patent: Mar. 7, 1989

[54] PROCESS FOR DEODORIZING AND/OR PHYSICAL REFINING RELATIVELY SMALL, VARYING CHARGES OF HIGH-BOILING LIQUIDS

[76] Inventor: Hermann Stage, Ludgeristrasse 9, 4400 Münster, Fed. Rep. of Germany

[21] Appl. No.: 159,432

[22] Filed: Feb. 17, 1988

Related U.S. Application Data

[63] Continuation of Ser. No. 787,956, Oct. 16, 1985, abandoned.

[30] Foreign Application Priority Data

Jul. 10, 1985 [DE] Fed. Rep. of Germany ....... 3524656

[51] Int. Cl.[4] .......................... B01D 1/14; B01D 1/22

[52] U.S. Cl. .......................................... 203/4; 203/23; 203/72; 203/79; 203/89; 203/92; 203/DIG. 9; 203/DIG. 11; 159/13.2; 159/13.4; 159/16.3; 159/43.1; 159/46; 159/49; 159/DIG. 9; 260/419; 260/428; 426/488; 426/492

[58] Field of Search ................. 203/72, 89, 99, 92-98, 203/1, DIG. 11, DIG. 7, 4, DIG. 9, 23, DIG. 25, 49, 79, 80, 85; 202/236, 234, 154, 177, 176, 181, 173, 159, 205; 159/43.1, 43.2, 13.2, 16.3, 13.4, 44, 49, 46, 29, 27.4, DIG. 9; 165/154, 66; 260/428, 419; 422/116, 70

[56] References Cited

U.S. PATENT DOCUMENTS

| | | | |
|---|---|---|---|
| 2,336,493 | 12/1943 | Marks | 203/DIG. 11 |
| 2,852,446 | 9/1958 | Bromberg | 203/4 |
| 3,233,663 | 2/1966 | Elliott | 165/66 |
| 3,532,606 | 10/1970 | Sibert | 202/181 |
| 3,540,982 | 11/1970 | Sepall | 422/116 |
| 3,846,249 | 11/1974 | Merriman | 203/99 |
| 3,966,559 | 6/1976 | Athanassiadis | 159/43.1 |
| 4,071,398 | 1/1978 | Baierl | 203/DIG. 11 |
| 4,129,606 | 12/1978 | Gewartowski | 203/23 |
| 4,273,670 | 6/1981 | Cheng et al. | 159/43.1 |
| 4,394,221 | 7/1983 | Stage et al. | 203/92 |
| 4,426,322 | 1/1984 | Stage | 203/89 |
| 4,450,047 | 5/1984 | Malzahn | 203/89 |
| 4,599,143 | 7/1986 | Stage | 203/72 |

*Primary Examiner*—Wilbur Bascomb

*Attorney, Agent, or Firm*—Leydig, Voit & Mayer

[57] ABSTRACT

Deodorizing and/or physical refining of relatively small, varying charges of high-boiling liquids, viz. fatty acids, edible oils, fats, glycerides and other high-boilding esters, is conducted continuously in a single-stage or multi-stage falling-film column (20) through the trickle passages (23) of which stripping steam is passed in counter-current flow. In the supply conduit (15, 15', 15", 15''') leading to the falling-film column and in the discharge conduit (30, 30', 30", 30''') leading away from the bottom (26) of the falling-film column a plug-flow of the liquid is maintained. Upon a change of charge the fresh liquid to be treated is normally introduced into the supply conduit—without any blank charge—directly following the liquid of the preceding charge. Charging of the liquid onto the deflector (22) in the head (21) of the falling-film column is interrupted for a short period of time when the front of the liquid of the fresh charge has reached a check valve (16) disposed adjacent said deflector.

11 Claims, 2 Drawing Sheets

Figure 1:
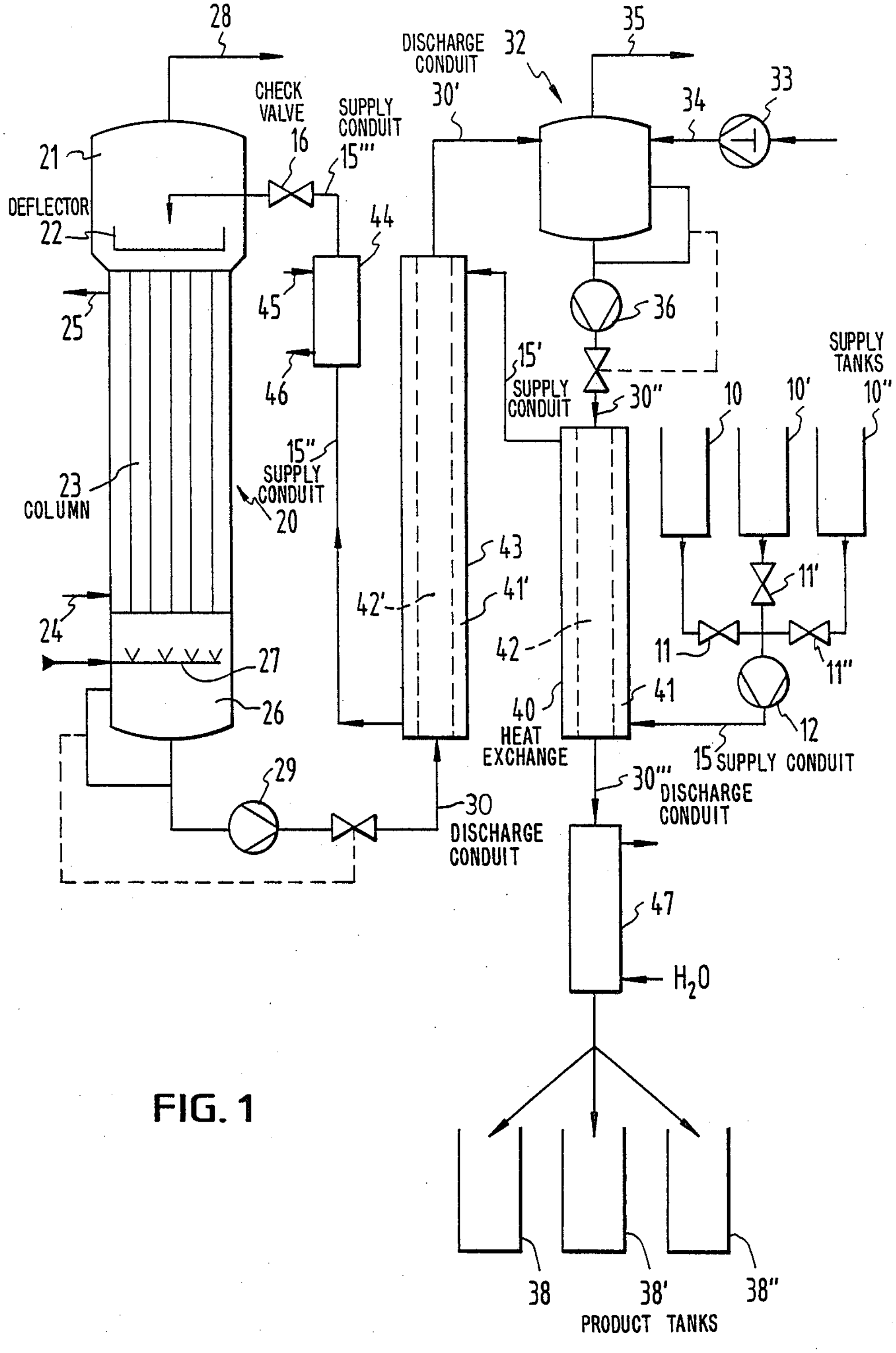

PROCESS FOR DEODORIZING AND/OR PHYSICAL REFINING RELATIVELY SMALL, VARYING CHARGES OF HIGH-BOILING LIQUIDS

This application is a continuation of application Ser. No. 787,956, filed Oct. 16, 1985 and now abandoned.

The invention is directed to the deodorizing and/or physical refining of relatively small, varying charges of high-boiling liquids such as fatty acids, edible oils, fats, glycerides and other high-boiling esters. To this end the invention provides a novel process and a novel system for conducting said process.

While no limitation is intended, the invention will be described hereinbelow with particular reference to the deodorizing and/or physical refining of relatively small, varying charges of edible oils. It will, however, be evident to those in the art that the invention may be likewise employed for deodorizing and/or physical refining of relatively small, varying charges of the other high-boiling liquids and in such cases will yield the same or analogous advantages.

The usual systems for deodorizing and/or physical refining of relatively small, varying charges of edible oils are mostly designed for a throughput of about 2 to 3 tons of crude oil per hour. In practice, a "relatively small" charge of edible oil comprises a quantity of about 10 to 50 tons. For operational and economic reasons it is necessary in most edible-oil refineries to change several times a day to other oil grades. In most cases both the starting oils and the finished oils differ as to their characteristics such as iodine value, glyceride composition, titre etc. to such an extent that any significant mixing of the successive charges upon a change from one oil grade to another cannot be permitted.

Until recently, deodorizing and/or physical refining of relatively small, varying charges of edible oils has mostly been conducted in semi-continuous systems having a plurality of superposed exchanger stages. Typically, the edible oil which has been heated to a temperature of 240° to 270° C. is treated at a working pressure of less than 10 mbar with stripping steam in various holding vessels. The holding time in each stage typically is 20 to 60 min. In order to prevent mixing of the successive types of oil upon a change of charge during operation of such systems, interposed blank charges are provided. Considering an average retention time of about 80 to 220 min of the oil particles of one charge to pass for example through five superposed stages through which the flow must successively pass, such a blank charge causes a loss in throughput which corresponds to the oil throughput that may be achieved within a period of 30 to 40 minutes. If, for instance, the product is changed three times a day, the throughput losses caused by the blank charges will add up to several tons of crude oil; in case of a system having a capacity of 3 tons, these throughput losses caused by a change of charge may add up to values of 10% and more of the overall throughput.

The invention proceeds from a process for deodorizing and/or physical refining of relatively small, varying charges of high-boiling liquids, viz. fatty acids, edible oils, fats, glycerides and other high-boiling esters, in which the liquid, which is respectively heated to a temperature of 180° to 280° C., is treated with stripping steam while being subjected to a working pressure of less than 10 mbar.

Proceeding from a process of the above-specified kind, the invention is based on the object of preventing any significant mixing of the respective liquids upon a change of charge, while the throughput losses shall be considerably reduced as compared to the conventional process. Furthermore, a system for conducting the improved process is to be provided.

In more detail, the inventive improvement of the above-specified process resides in that the stripping steam treatment is continuously conducted in a single-stage or multi-stage falling-film column whose trickle passage walls are kept at a higher temperature than the falling liquid film, and stripping steam is passed in countercurrent flow through said trickle passages;

that a plug-flow of the liquid is maintained in the supply conduit leading to the falling-film column and in the discharge conduit exiting from the bottom of the falling-film column;

that upon a change of charge the fresh liquid to be treated is normally introduced into the supply conduit directly following the liquid of the preceding charge - without any blank charge; and that charging of the liquid onto the deflector in the head of the falling-film column is interrupted for a short period of time when the front of the liquid of the fresh charge has reached a check valve disposed adjacent said deflector.

The system according to the invention for conducting the novel process provides at least the following system components:

a single-stage or multi-stage falling-film column;

a supply conduit leading from a number of liquid supply tanks to a deflector in the head of the falling-film column;

a discharge conduit leading from the bottom of the falling-film column to a number of product tanks; wherein the supply conduit and the discharge conduit depending on the capacity of the falling-film column has such a diameter that the liquid passes as plug-flow through these conduits; and a check valve is disposed in the supply conduit adjacent the deflector in the head of the falling-film column.

The following explanations are specifically directed to deodorizing and/or physical refining of palm oil, but the basic experiences may readily be transferred to the treatment of other triglycerides and other high boiling liquids. Palm oil and other vegetable oils contain, in addition to the fatty acid glycerides, a proportion of light ends in the order of about 5 wt. %. The main proportion of light ends consists of free fatty acids and a large number of further ingredients such as water, pigments, stabilizers, odorous and/or flavouring compounds and the like. In the course of physical refining it is especially necessary to remove the malodorous lower fatty acids and other odorous compounds which are in part formed by autoxidation. Mere deodorizing will be considered when the oil had previously been subjected to chemical refining. In case of the hydrogenated fats such as fish oils, the deodorizing and/or physical refining also serves the purpose of removing the unpleasant hydrogenation smell. During the high-temperature stripping steam treatment these light ends as well as the decomposition products caused by high temperature such as hydrocarbons, methyl ketones, aldehydes and the like concentrate in the vaporous stream and are removed therewith. In the above-mentioned semicontinuous systems which are typical for the deodorizing and/or physical refining of relatively small, varying charges of edible oils it is possible to reduce the light-ends content in the treated oil to less than 0.03 wt. % at a temperature of about 240° to 270° C. and a working pressure of about 3 to 6 mbar by using a quantity of stripping steam of 1.5 to 4 wt. % of the palm oil throughput.

Insofar as there is no limitation to relatively small, varying charges, it has already been proposed to conduct deodorizing and/or physical refining of edible oils under conditions of continuous counter-current falling-film stripping-steam distillation in an externally imposed temperature field in a single-stage falling-film column (see U.S. Pat. No. 4,394,221) or in a multi-stage falling-film column (see U.S. Pat. No. 4,599,143). The content of the U.S. Pat. No. 4,599,143 shall be incorporated herein by reference.

Under the known conditions of continuous counter-current falling-film stripping-steam distillation the liquid, which has been heated to a temperature of 220° to 280° C., typically flows at a working pressure of from 2 to 10 mbar as a thin film with a film thickness of less than 1.0 mm down the wall of vertically arranged surfaces which form trickle passages, of which surfaces at least some are held at a higher temperature than the down-flowing liquid, and in counter-current flow thereto steam is passed through said trickle passages. When a multi-stage falling-film column is provided, the trickle passages in the upstream initial zone preferably have larger hydraulic diameters than the trickle passages in the final zone. Due to the developing flow conditions and viscosities of the down-trickling liquid, the holding time of individual liquid particles in such a single-stage or multi-stage falling-film column is less than 20 seconds. Nevertheless, satisfactory deodorizing and/or physical refining down to light-ends contents of less than 0.03 wt. % of the finished oil is achieved.

The falling-film columns which have been known for deodorizing and/or physical refining of edible oils are mostly designed for considerable throughputs. As shown in the examples of the U.S. Pat. No. 4,599,143, the initial stage of such a falling-film column comprises 60 tubes (length 4 m) with an inner diameter of 84 mm and is designed for a throughput of 10 tons of palm oil per hour. Although, at first glance, such a falling-film column does not seem suitable for deodorizing and/or physical refining of relatively small, varying charges of edible oils, it has been found within the scope of the present invention that after termination of oil supply to the deflector in the head of such a column the quantity of oil remaining on the inner walls of the tubes has surprisingly decreased to less than 15 kg of oil within a period of about 2 minutes, provided the viscosity of the oil film is less than 1 cP. Tests with differently designed falling-film columns also have confirmed that the residual quantity of oil remaining in the falling-film column has decreased within a few minutes after termination of the oil supply to 1 to 2/1000 of the rated throughput per hour.

In practical use, the oil throughputs per charge are hardly less than 5 tons. It is evident that under these conditions the residual quantity of oil remaining in the falling-film column about two minutes after termination of oil supply is sufficiently small, so that there is no risk in accepting mixing thereof with the oil of the succeeding charge, because no significant changes of the oil characteristics need be feared. Consequently, deodorizing and/or physical refining of relatively small, varying charges of edible oils and other high-boiling liquids may quite well be conducted in the falling-film columns known from the U.S. Pat. No. 4,394,221 or the U.S. Pat. No. 4,599,143 under the conditions described therein, provided certain measures are additionally taken.

It is one of said additional measures to interrupt the oil supply to the falling-film column for a short period of time in case of a change of charge. It has been found within the scope of the present invention that even with falling-film columns having a length of 8 to 10 (meter) an interruption of not more than 4 minutes will be quite sufficient to prevent any mixing of the different oil grades with a significant change in the oil characteristics in case of a change of charge, provided the succeeding charge comprises at least 5 tons of oil. In most cases an even shorter interruption of the oil supply for about 1 to 2 minutes will suffice to safely prevent any such detectable mixing.

It is therefore preferred that the short period of time, for which the liquid supply to the deflector in the head of the falling-film column is interrupted when the front of the liquid of the succeeding fresh charge has reached a check valve adjacent said deflector, should be 4 minutes or less, and it is especially preferred that it should be 2 minutes or less.

Another one of said additional measures furthermore resides in that upon a change of charge any mixing of the succeeding oil charges in the remaining other parts of the system is prevented.

Apart from usual components such as pumps, fittings, valves and the like, such other system parts include especially the supply conduit leading to the falling-film column and the discharge conduit exiting from the bottom of the falling-film column. In accordance with a further aspect of the invention a plug-flow of the liquid is maintained in said supply and discharge conduits so that upon a change of charge any considerable mixing of successive oil charges is prevented. Such a plug-flow is ensured, for instance, by a sufficiently high flow rate of the oil, which provides turbulent flow conditions in said conduits. To this end the flow rate of the oil in said conduits should be at least 1 ms. Flow rates of at least 1.5 to 2.5 m/s in said conduits will be even better; such flow rates are especially preferred within the scope of the invention.

When designing the conduits, smooth inner walls with a uniform hydraulic diameter are desirable. Any grooves and other "dead" spaces, in which residual liquid separated from the main liquid stream might accumulate, should be avoided. Insofar as variations of the hydraulic diameter of the effective conduit cross-section cannot be avoided in the region of pumps, valves and the like, such variations should result—in the direction of flow—in smaller hydraulic diameters, whereby the flow rate and the turbulent flow characteristic are increased.

Provided these two additional measures are taken and observed, it is possible within the scope of the present invention upon a change of charge to introduce the fresh liquid to be treated—without any blank charge—into the supply conduit directly following the liquid of the preceding charge. Thereby, a higher throughput per unit of time is achieved, because the blank charges required in the prior art to prevent mixing of the different oil grades upon a change of charge are no longer required. Moreover, the operation of pumps, heat exchangers and the like is facilitated, because the system may be operated practically continuously with the full liquid stream.

Avoiding the use of any blank charges upon a change of charge is a suitable and advantageous, though not a necessary measure within the scope of the present invention. If desired in any single case, a closely dimensioned blank charge could also be provided upon a change of charge so as to prevent direct contact between the preceding and the succeeding liquid. Alternatively, it would also be possible in order to prevent such a direct contact to introduce an inert buffer substance following the preceding liquid, after which buffer substance the succeeding liquid would follow, so that any pressure decrease within the conduits is avoided upon a change of charge. Preferably, the invention provides upon a change of charge that the fresh liquid to be treated —without any blank charge—is introduced into the supply conduit directly following the liquid of the preceding charge.

It is common practice in the field of deodorizing and/or physical refining to utilize the sensible heat of the hot finished oil for heating the crude oil. Typically, the hot finished oil is passed as "heat medium" through a heat exchanger, in which the crude oil is heated to a temperature which is about 20 to 30° K. below the desired operating temperature. The still required heating to the operating temperature is then performed in a downstream high-temperature heat exchanger. In accordance with an advantageous embodiment of the invention said heat exchange between hot finished oil and crude oil takes place in one or several double-pipe heat exchangers, wherein a plug-flow of the liquid is maintained both in the inner and the outer pipe of the double-pipe heat exchanger. A suitable double-pipe heat exchanger may have straight or curved configuration; for example, a helical configuration may be provided so as to provide more heat-exchanger capacity within a given volume. Since the heat-exchanging performance of a double-pipe heat exchanger frequently is unable to achieve that of otherwise commonly used heat exchangers, it would be suitable to provide two or more double-pipe heat exchangers so as to completely transfer the sensible heat of the hot finished oil to the crude oil which is to be heated.

Preferably, approximately similar hydraulic diameters are provided for the cross-section of the inner pipe and the effective cross-section of the outer pipe of such a double-pipe heat exchanger. Preferably, said hydraulic diameters are dimensioned such that the same flow rate of the liquid prevails in the inner pipe of the double-pipe heat exchanger and in the supply conduit; accordingly, the effective cross-section of the outer pipe of the double-pipe heat exchanger is dimensioned such that the liquid will flow therein at the same rate as in the discharge conduit. It is especially preferred that the same flow rates of the liquid are provided in the supply conduit, the discharge conduit, the inner and the outer pipe of the double-pipe heat exchanger(s). To ensure a plug-flow having a turbulent flow characteristic, said flow rate should be at least 1 m/s. Flow rates of at least 1.5 to 2.5 m/s are even better. It is therefore especially preferred that the flow rate of the liquid in these system parts should be at least 2 m/s.

Falling-film columns of the kind known from the U.S. Pat. No. 4,394,221 or the U.S. Pat. No. 4,599,143 are typically designed for the physical refining of 5 or 10 tons of edible oil per hour. These falling-film columns may easily be adapted to a higher throughput, for example to the physical refining of 50 tons of edible oil per hour. With the process according to the invention it is possible also to perform deodorizing and/or physical refining of relatively small, varying charges of high-boiling liquids, especially edible oils, in such relatively large, high-efficiency systems in an economic manner. It is now possible also to physically refine and/or deodorize small charges of edible oil rapidly and gently, i.e. with a holding time of less than 1 minute in the high-temperature portion of the system, at temperatures above 200° C. Under these conditions the greater part of the natural stabilizers such as tocopherols, sterol and other similar compounds is retained so that an oil treated in this way exhibits improved storage life. A change of charge may be effected within a few minutes, for example within 6 minutes or even less. It is neither necessary to provide the blank charges required in the prior art, nor will there be any significant product loss. In spite of this extremely fast change of charge there is no significant mixing of the succeeding charges upon a change from one oil grade to another one, so that there will be no detectable change in the characteristics of any one oil grade.

Modifications and alterations in the above-explained process of deodorizing and/or physical refining relatively small, varying charges of high-boiling liquids will be possible within the scope of the present invention.

In case of a change of charge it is possible to effect direct change-over from a supply tank containing a specific liquid to another supply tank containing another specific liquid. A delivery pump forces the fresh liquid to be treated into the supply conduit so that the front of said liquid directly follows the liquid of the preceding charge. When during a change of charge the front of the succeeding charge has reached the check valve disposed adjacent the deflector in the head of the falling-film column, said check valve is closed to block the oil supply to the falling-film column. Said check valve is closed for a short period of time. In said sense "a short period of time" means at least sufficient time to allow the previous charge of liquid to essentially clear the trickle passages and preferably the bottom of the falling-film column as well. The falling-film column should be emptied as far as possible. Preferably, the remaining part of the previous charge within the falling-film column should be decreased to less than 1% of the rated throughput per hour. Typically, a respective run-off of the previous charge of liquid from the falling-film column is achieved in about six minutes or less.

In order to have a fast response, said check valve is preferably designed as a quick-operating valve.

During blocking for a short period of time, the content of the falling-film column which still consists of the preceding charge may be discharged along two different paths. During a first time interval within said short period of time when the liquid supply is interrupted, the liquid collected in the bottom of the falling-film column will be forced into the discharge conduit. Thereafter, a valve disposed in said discharge conduit is changed over, and the liquid quantity additionally accumulated in the bottom of the falling-film column during a succeeding, second time interval within said,short period of time while the liquid supply is interrupted will be passed to a separate container. When the valve adjacent the deflector in the head of the falling-film column is opened so that now the succeeding liquid charge can be subjected to treatment in the falling-film column, a valve disposed in the conduit leading to the container is closed. The treated liquid from the succeeding charge, which now collects in the bottom of the falling-film column, is again forced into the discharge conduit.

The container for receiving a second residual quantity of the content of the falling-film column upon blocking of the liquid supply to the deflector in the head of said column may be provided with a cooling device. Furthermore, the addition of a complexing agent such as citric acid into said container may be provided for stabilizing the liquid collected therein. Moreover, the container is connected to various stages of the vacuum system. The content of said container is finally transferred to the product tank for the finished oil of the preceding charge. While the second porton of the content of the falling-film column passes into the container, the discharge conduit may be purged with an inert gas, as will be explained in detail below with reference to FIG. 2.

It is furthermore possible to purge the system parts adjacent the falling-film column with an inert gas such as nitrogen. This may be especially suitable for the discharge conduit in order to prevent any possible mixing of the finished oil of the preceding charge with the front of the treated oil of the succeeding charge inside said discharge conduit. Purging of the discharge conduit is appropriately effected within the second time interval while the second portion of the content of the falling-film column passes into the container.

The invention is directed to deodorizing and/or physical refining of relatively small, varying charges of high-boiling liquids, i.e. fatty acids, edible oils, fats, glycerides and other high-boiling esters. "High-boiling" in this connection means that at a negative pressure of 12 mbar the liquid to be treated would start boiling already above its decomposition temperature of about 300° C. Suitable fatty acids are, for example, higher-boiling anhydrized fatty acids of fish oils and other hydrogenated fatty acids, from which the hydrogenating smell is removed. Suitable edible oils are, for example, palm oil, soy bean oil, cotton seed oil, coconut oil, palm kernel oil, rape-seed oil, olive oil, wheat germ oil, hydrogenated fish oil and the like. Suitable fats are, for example, beef tallow, hog fat, mutton tallow and the like. Suitable glycerides comprise, in addition to the triglycerides, the mono- and diglycerides of any fatty acids such as synthetic triglycerides, which will melt at body temperature (for example bases for suppositories). Other high-boiling esters comprise, for example, the esters of phthalic acid, sebacic acid and the like which may be used as plasticizers, as well as the esters of higher alcohols with fatty acids such as butyl stearate and similar esters Moreover, the process according to the invention is suitable for removing the hydrogenation smell of other hydrogenated fats and oils.

"Relatively small charges" in this connection means that a charge of a specific liquid with corresponding characteristics such as iodine value, glyceride composition, titre etc. comprises a quantity of at least 5 tons. Typically, a "relatively small charge" comprises about 20 to 50 tons of liquid. Within the scope of the invention, deodorizing and/or physical refining is conducted in falling-film columns which may typically be designed for a throughput of 5, 8 or 10 tons per hour, but in the individual case may also be designed for a throughput of 50 tons per hour. Under lhese conditions, a change of charge will be necessary after a few hours. Under the conditions provided in accordance with the invention, such changes of charge may be performed within six minutes or less, so that the throughput losses common in the prior art upon a change of charge will be considerably reduced. Nevertheless, any mixing of succeeding charges, which might result in a detectable variation of the characteristics, is substantially or even completely prevented; complete preventing of any mixing is possible when the second portion of the content of the falling-film column is collected in a separate container during the second time interval of temporary interruption of liquid supply to the falling-film column, and when the discharge conduit is purged with inert gas during said second time interval. The second portion of the content of the falling-film column collected in said separate container may be discharged into the product tank of the preceding charge at a later time while the second charge is being treated. In this way it is possible upon a change of charge not only to completely prevent any mixing of the succeeding charges, but also to avoid any product loss.

Figure 2:
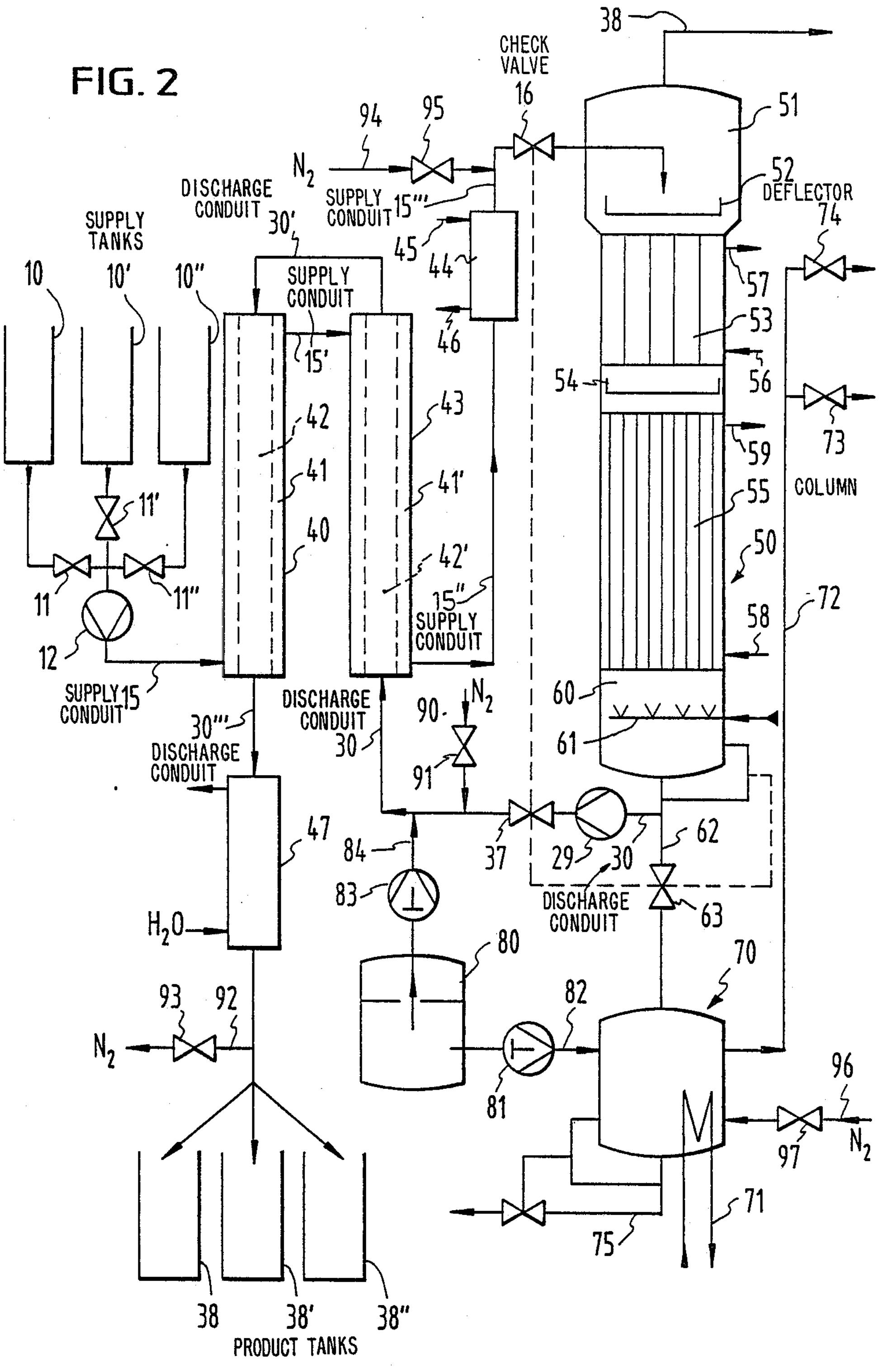

Below, the system for conducting the process according to the invention will be described by means of preferred embodiments thereof with reference to the drawing, in which:

FIG. 1 is a first flow diagram of a system for conducting the process according to the invention; and FIG. 2 is a second flow diagram of a system for conducting the process according to the invention, in which a collecting container for a portion of the content of the falling-film column in additionally provided.

As will be apparent from FIG. 1, the overall system for deodorizing and/or physical refining of relatively small, varying charges—apart from the usual components of such systems such as pipes, pumps, fittings, regulators and the like—mainly comprises the crude oil storage and supply tanks 10, the supply conduit 15, the falling-film column 20, the discharge conduit 30, the heat exchanger 40 and the product tanks 38.

More in detail, FIG. 1 shows a plurality of supply tanks 10, 10', 10'' in which the various charges of oils to be treated successively are contained. Upon corresponding switching of the valves 11, 11', 11'' the desired crude oil is forced by the delivery pump 12 into the supply conduit 15. The supply conduit comprises a plurality of supply conduit sections 15, 15', 15'', 15'' and finally leads to the deflector 22 in the head 21 of the falling-film column 20. The supply conduit section 15 leads to a first double-pipe heat exchanger 40. In the embodiment illustrated, the crude oil to be heated flows through the outer jacket pipe 41 which surrounds the inner pipe 42 of this double-pipe heat exchanger 40. Hot finished oi1 is passed through the inner pipe 42. Alternatively, the liquids could also be passed therethrough oppositely, i.e., the cold crude oil flows through the inner pipe 42 while the hot finished oil flows through the outer jacket pipe 41. A second supply conduit section 15' leads to a second, substantially analogous double-pipe heat exchanger 43, in which the crude oil is further heated by heat transfer from hot finished oil. Said second double-pipe heat exchanger 43 again comprises an outer jacket pipe 41' and an inner pipe 42'. From the second double-pipe heat exchanger 43 the crude oil is passed via a third supply conduit section 15'' into a high-temperature heat exchanger 44, in which the final heating to the desired operating temperature takes place. The high-temperature heat exchanger 44 likewise is suitably designed as a double-pipe heat exchanger so that here, too, a plug-flow of the crude oil is possible. Heating medium is supplied to the high-temperature heat exchanger 44 through the port 45 and is discharged therefrom through the port 46; at the desired temperature range either high-pressure steam or a high-temperature oil such as, for example, "HT-oil" (higher aromatic compounds) may be used as heating medium. A fourth supply conduit section 15''' finally leads to the deflector 22 in the head 21 of the falling-film column 20. Adjacent the deflector 22 the check valve 16 is disposed in this fourth supply conduit section 15'''. Preferably, the check valve 16 is a quick-operating valve which immediately interrupts the liquid supply to the falling-film column when the front of a succeeding charge reaches this check valve 16. As the length of the supply conduit 15, 15', 15'', 15''' from the valves 11, 11', 11' to the check valve 16 and also the flow rate of the liquid are known, switching of the check valve 16 may be effected in response to time with a predetermined delay after actuation of the valves 11, 11' and/or 11''.

In the illustrated embodiment the falling-film column 20 is of single-stage configuration, and its trickle passages 23 have uniform constant trickle-passage diameter over the entire length thereof. The trickle portion of the falling-film column 20 may be composed of a tube bundle including 60 tubes 23 each having a length of 8 m and a diameter of 50 mm. Heating medium, which is supplied via the port 24 and discharged via the port 25, flows about the outer periphery of the individual tubes 23. As illustrated, a counter-current flow of the heating medium relative to the down-flowing liquid film is provided; the heating medium used is preferably high-temperature oil so as to produce a temperature drop on the side of the heating medium. In this way optimum heat transfer is ensured while overheating of the liquid can be prevented.

The stripping steam supply 27 is provided in the bottom portion 26 of the falling-film column 20. The stripping steam flows in counter-current flow to the down-flowing liquid film through the trickle passages 23 and accumulates in the head 21 together with the low-boiling components removed from the oil. Thence, the vaporous mixture is withdrawn through the vapour conduit 28 which leads to the vacuum system through a jet condenser (not illustrated).

The treated finished oil accumulating in the bottom 26 of the falling-film column 20 is forced by the delivery pump 29 into the discharge conduit 30. The dscharge conduit 30 leads to the double-pipe heat exchangers 43 and 40, where the hot finished oil transfers a portion of its sensible heat to the crude oil to be heated. After passage through the double-pipe heat exchanger 40, the extensively cooled finished oil flows through a further discharge conduit section 30''' into a final cooler 47 to which cooling water is supplied as coolant. Subsequently, the finished oil is passed to one of the product storage tanks 45, 45' or 45''.

A stabilizing vessel 32 may be additionally provided, in which a complexing agent such as citric acid is added to the finished oil for stabilizing the same. In the illustrated embodiment, said stabilizing vessel is inserted between the two double-pipe heat exchanger 43 and 40 so that the finished oil is already partially cooled when it reaches the stabilizing vessel 32 through the second discharge conduit section 30'. Said stabilizing vessel 32 is supplied with the stabilizer, for example citric acid, from a corresponding supply thereof (not illustrated) via a metering valve 33 and the metering conduit 34. The stabilizing vessel 32 is vented via the vapour conduit 35 towards the vacuum system. From this stabilizing vessel 32 the finished oil mixed with stabilizer is withdrawn via the pump 36 and is forced as a plug-flow into the second discharge conduit section 30'' leading to the double-pipe heat exchanger 40.

In the illustrated embodiment the single-stage falling-film column 20 is designed for a palm oil throughput of about 8 to 10 tons per hour. Based on this throughput, a hydraulic diameter of about 44 to 52 mm is provided for the various supply conduit sections 15, 15', 15'' and 15''', for the various discharge conduit sections 30, 30', 30'' and 30''' and for the liquid-passing tubes inside the heat exchangers 40, 43, 44 and 47, so that a plug-flow of the liquid can be maintained inside said tubes. With a tube diameter of 50 mm and a mass flow of 8300 kg of palm oil per hour, a flow rate of about 1.5 m/s will be established in said tubing. Such a flow rate produces a turbulent flow characteristic and thereby ensures the desired plug-flow. Due to this plug flow it is possible in case of a change of charge to close the valve 11 directly after the supply tank 10 is or has become empty and to open, for example, the valve 11' to the supply tank 10', so that the front of the succeeding charge from the crude oil tank 10' will be forced by the delivery pump 12 through the supply conduit sections 15, 15', 15'' and 15''' directly following the preceding charge.

When this front has reached the check valve 16, the latter will be closed for a short period of time so as to interrupt the crude oil supply to the deflector 22 of the falling-film column 20. Since the check valve 16 preferably is a quick-operating valve, a precise and instantaneous interruption of the liquid flow is possible. During this brief interruption the supply of stripping steam to the falling-film column 20 is continued, so that the content of the falling-film column reaches the discharge conduit section 30 in a completely physically refined and/or deodorized state.

FIG. 2 illustrates a further system for conducting a modified embodiment of the process according to the invention. The configuration of the system of FIG. 2 is substantially analogous to that of the system of FIG. 1; insofar as there is conformity, reference is made to the explanation of corresponding system parts of FIG. 1.

The significant differences reside in that the falling-film column is of two-stage configuration, that additionally a vessel for accommodating part of the content of the falling-film column during the brief interruption of the liquid supply to the same is provided, and that equipment is provided for purging the supply conduit and especially the discharge conduit by means of inert gas.

The falling-film column 50 is different in that it is of two-stage configuration. In the head 51 of this two-stage falling-film column 50 there is provided the deflector 52 through which the charged liquid is initially distributed to the wide trickle tubes 53 of the initial zone of this falling-film column 50. These wide trickle tubes 53 may, for example, have a length of 4 m and a trickle-passage diameter of 84 mm. Following these wide trickle tubes 53, the down-trickling liquid film is again collected in a second deflector 54 and is thence distributed to the narrow trickle tubes 55 of the final zone of this falling-film column. This final zone may, for example, be constituted by 153 tubes having a length of 7 m and a tube diameter of 33 mm. With such a falling-film column, 10 tons of palm oil per hour can be physically refined. Again, heating medium flows about the outer walls of the wide trickle tubes 53 and of the narrow trickle tubes 55, said heating medium being supplied through the ports 56 and 58 and being discharged through the ports 57 and 59, respectively. The introduction of stripping steam occurs exclusively by means of the stripping steam supply means 61 into the bottom 60 of the final zone of the falling-film column 50. The stripping steam first flows through the narrow trickle passages 55 and then through the wide trickle passages 53 and is finally withdrawn from the head 51 together with the separated low-boiling components via the vapour conduit 38 and after cooling in a jet condenser (not illustrated) is supplied to the vacuum system.

The first discharge conduit section 30 branches off a conduit 62 which leads from the bottom 60 of the falling-film column 50 via a check valve 63 to a vessel 70. Said vessel 70 is used for temporarily receiving a part of the content of the falling-film column 50 when the supply of liquid to the deflector 52 has been briefly interrupted by the check valve 16. As indicated schematically, this vessel 70 may be equipped with cooling means 71 for cooling the fully deodorized and/or physically refined finished oil received therein. By means of a vapour conduit 72 the vessel 70 is in communication with the vacuum system (not illustrated), and in accordance with the position of the valves 73 or 74 connection to the 120 mbar stage or the 4 mbar stage of the vacuum system is possible. From a storage tank 80 a complexing agent such as citric acid used as stabilizer may be introduced into the vessel 709 via a metering valve 81 and a metering conduit 82. Furthermore, and different from the embodiment shown in FIG. 1, stabilizer from this storage tank may be added via the second metering valve 83 and the second metering conduit 84 to the finished oil in the first discharge conduit section 30; alternatively, this second metering conduit 84 could also terminate in the second discharge conduit section 30' so that the stabilizer is introduced into finished oil that is already partially cooled.

When a change of charge has been performed by appropriate switching of the valves 11, 11' or 11'' and the front of the succeeding charge has reached the check valve 16 adjacent the deflector 52 in the head 51 of the two-stage falling-film column 50, the check valve 16 is closed for a brief period of time. During a first time interval within this brief interruption the valve 37 in the first discharge conduit section 30 continues to be open so that the delivery pump 29 may continue to withdraw the first part of the physically refined content of the falling-film column 50 from the bottom 60 thereof and to force it into the discharge conduit. While the check valve 16 continues to be closed, a change-over is effected so that the valve 37 is closed and the valve 63 is opened. Now, the second part of the physically refined content of the falling-film column 50 is passed into the vessel 70, where it is cooled and stored for some time. Even while the valve 63 is open, the supply of stripping steam is continued so that also the second part of the content of the falling-film column 50 will be completely physically refined and/or deodorized. When the falling-film column 50 has been emptied as far as possible, the check valve 16 is reopened, the valve 63 is closed, and the valve 37 is opened; to this end a schematically indicated interlocking control between these valves is provided, which also detects the level in the bottom 60 of the two-stage falling-film column 50.

Moreover, means are provided for purging sections of the system, especially the discharge conduit 30, 30', 30''', with an inert gas. The inert gas used may be nitrogen, argon, helium and the like, dry nitrogen being used preferably. For purging the discharge conduit 30, 30', 30''' it is possible to blow nitrogen via the port 90 and the valve 91 into the first discharge conduit section 30 whereby the liquid is forced into the product tank 38, 38' or 38''.

Excess gas will be vented via the port 92 and the valve 93. Preferably, nitrogen is blown via the port 90 and the valve 91 into the first discharge conduit section 30 while the second part of the content of the falling-film column 50 is discharged into the vessel 70 with the valve 37 being closed and the valve 63 being opened.

If required, the supply conduit 15, 15', 15'' and 15''' may also be purged, to which end nitrogen may be blown via the port 94 and the valve 95 into the fourth supply line section 15'''.

Finally, it is possible to blow nitrogen via the port 96 and the valve 97 into the vessel 70 so as to force the oil stored therein into the conduit 75. Since completely physically refined and/or deodorized oil is concerned, it may be discharged to the respective product tank 38, 38' or 38''.

I claim:

1. A continuous process for deodorizing and/or physically refining at least first and second untreated charges of different high-boiling liquids, said process comprising:

(1) supplying a first untreated charge via a supply conduit in which plug-flow is maintained to a deflector plate of a falling-film column with at least one stage having trickle passages communicating with the deflector plate;

(2) Contacting the first charge with a continuous supply of stripping steam as the first charge passes through the trickle passages, the walls of the trickle passages being maintained at a higher temperature than the down-flowing liquid film of the first charge and the stripping steam passing through the trickle passages in counter-current flow to the down-flowing liquid film;

(3) removing the treated first charge from the bottom of the falling-film column via a discharge conduit in which plug-flow is maintained;

(4) directly following the first charge,supplying a second untreated charge via the supply conduit in which plug-flow is maintained; and (5) interrupting for a short period of time the flow of the second untreated charge while maintaining the supply of steam once the front of the untreated second charge has reached a location adjacent the deflector, after which interruption the flow of the second untreated charge is continued along the supply conduit to the falling-film column.

2. The process of claim 1 wherein the flow of the second untreated charge is interrupted for a period of six minutes or less when the front of the liquid of the second untreated charge has reached a location adjacent the deflector.

3. The process of claim 2 wherein the flow of the second untreated charge is interrupted for a period of four minutes or less when the front of the liquid of the second untreated charge has reached a location adjacent the deflector.

4. The process of claim 3 wherein the flow of the second untreated charge is interrupted for a period of two minutes or less when the front of the liquid of the second untreated charge has reached a location adjacent the deflector.

5. The process of claim 1 wherein at least a portion of the sensible heat in the treated first charge withdrawn from the falling-film column is transferred to the second untreated charge prior to the second untreated charge entering the falling-film column, the heat transfer taking place in at least one double-pipe heat exchanger means with plug-flow maintained in both the inner pipe and the outer pipe of said double-pipe heat exchanger means.

6. The process of claim 1 wherein the liquid flow rate in both the supply conduit and the discharge conduit is at least 1 meter per second to ensure plug-flow.

7. The process of claim 6 wherein the liquid flow rate in both the supply conduit and the discharge conduit is at least 2 meters per second.

8. The process of claim 1 wherein, during a first time interval within the short interruption of the flow of the second untreated charge, a first part of the first charge in the falling-film column is removed via the discharge conduit, and thereafter, during a second time interval within the short interruption of the flow of the second untreated charge, a second part of the first charge in the falling-film column is passed into a vessel.

9. The process of claim 1 wherein, after the passage of one charge through the supply conduit, the falling-film column and the discharge conduit, the supply conduit and the discharge conduit are purged with an inert gas.

10. The process of claim 8 wherein, within the second time interval, the discharge conduit is purged with an inert gas.

11. The process of claim 1 further comprising directly following the second charge, supplying a third untreated charge via the supply conduit in which plug-flow is maintained.

* * * * *